Patented Apr. 7, 1931

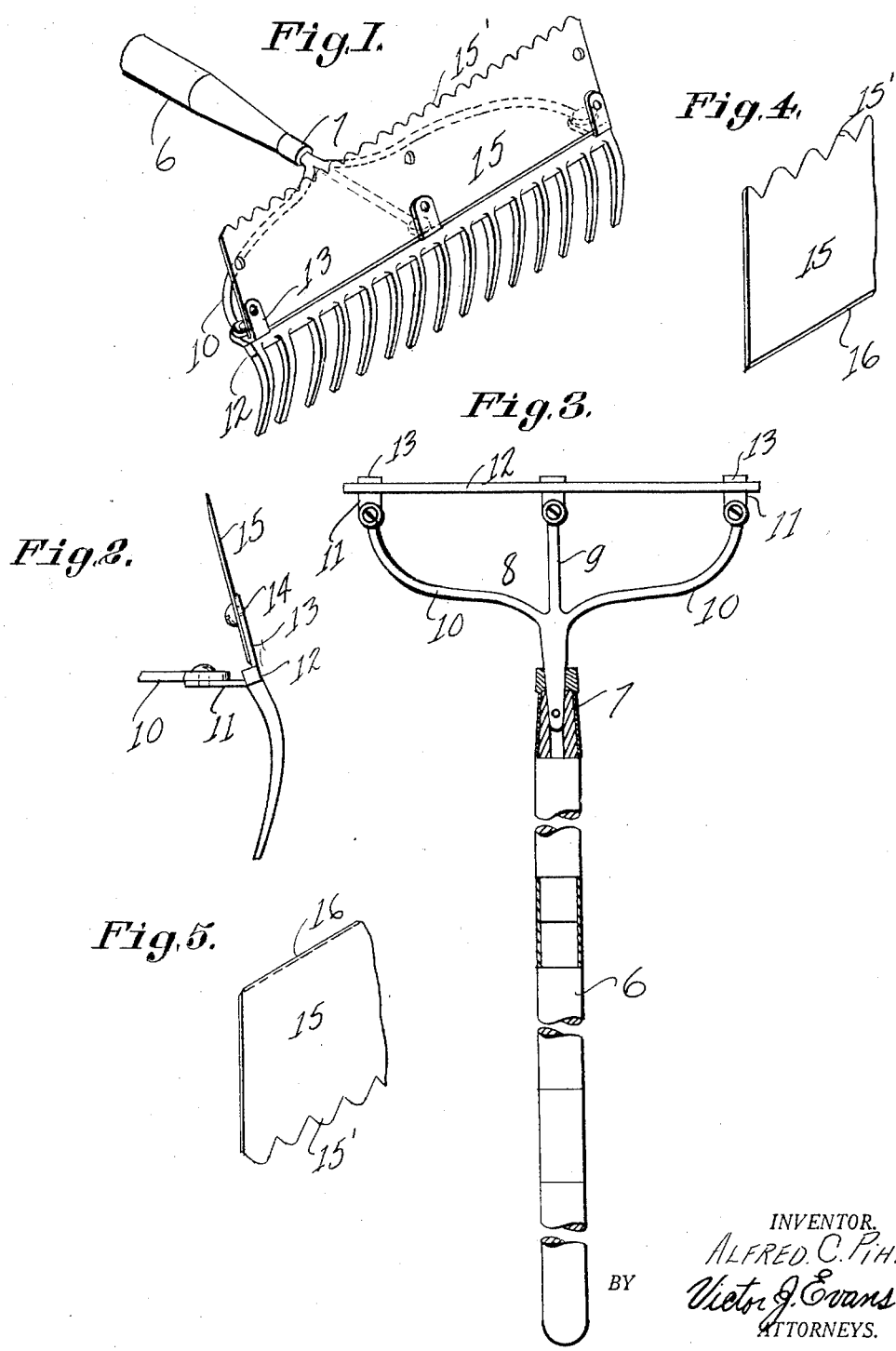

1,800,103

UNITED STATES PATENT OFFICE

ALFRED C. PIHL, OF EUREKA, CALIFORNIA

COMBINED RAKE AND CUTTER

Application filed October 10, 1928. Serial No. 311,596.

This invention relates to a combined rake and cutter.

The principal object of the invention is to provide a rake that has associated therewith an interchangeable cutting or scraping device that can be readily used to not only supply the necessary hoeing action in garden work, but will also serve to cut or dislodge roots, weeds or the like.

Another object of the invention is to provide a unique handle arrangement for the rake that is of the knock-down construction and a strong and durable means for retaining the rake on the handle member.

A further object of the invention is to provide a device of the character described which is simple in construction, economical to manufacture, positive in operation, strong and durable.

Other objects and advantages will be apparent during the course of the following description.

In the accompanying drawings forming a part of this specification, and in which like numerals are employed to designate like parts throughout the same, Figure 1 is a detail perspective view of the device, Figure 2 is a detail end view of the same, Figure 3 is a detail plane view of the holder with the sectional handle, Figure 4 is a perspective view of the hoe blade when positioned to be used as a hoe, and Figure 5 is a detail view of the same when employing the serrated cutting edge.

In garden work, in using a rake considerable annoyance and inconvenience has been experienced due to the fact that the end teeth of the rake are frequently broken, which breakage is caused by contacting a root or some solid object which prevents a thorough raking action.

The operator often uses the end teeth of the rake to dislodge foreign objects and thereby breaks the end teeth and accordingly, minimizes the efficiency of the rake. To eliminate this danger, I propose to employ in conjunction with the rake a reversible blade that can be used for hoeing purposes, which blade is provided with teeth on one edge and with a straight cutting edge on the opposite side thereof, so that by a mere manipulation of the rake handle on the part of the operator, the blade can be brought into operative position to readily cut or dislodge the objectionable weeds or roots.

In the accompanying drawings, the numeral 6 designates a sectional handle provided with a socket 7 in which is received a rake carrying member designated as a whole by the numeral 8.

This member comprises a central extension 9 and forked elements 10 that are secured as by bolts or suitable fastening elements 10' to lugs 11 carried by the rake 12. The latter has likewise secured thereto suitable brackets 13 which are in alignment with the lugs 11, and to which is detachably secured as by bolts 14, a blade 15 that is in the form of a metal strip and is provided on one side with a serrated edge 15' and its opposite side with a straight edge 16.

It will be obvious from the construction of the rake carrying element 8 that a strong and durable support for the rake is provided and that with the provision of the reversible blade 15, an interchangeable hoe element is combined with the rake so that the hoeing or raking action may be accomplished.

With a device constructed in accordance with my invention it will be obvious that it will be unnecessary to use the end teeth of the rake to dislodge a root, weed or the like, for a mere manipulation of the handle will cause the hoe with either of the designated cutting edges to come into an operative position, thus assuring a long life to the rake and at the same time, providing a positive cutting means that will cut through any kind of weed or root. Thereafter by bringing the rake into an operative position, the raking of the garden or the like can be quickly accomplished.

It is to be understood that the form of my invention herewith shown and described is to be taken as a preferred example of the same and that various changes relative to the shape, size, material and arrangements of parts may be resorted to without departing from the spirit of the invention, or the scope of the subjoined claim.

Having thus described my invention, I claim:—

A device of the character described comprising a handle member, a rake carrying element secured to said handle member and including a central extension and side fork elements, lugs formed on said rake element for receiving the extremity of said extension and the extremities of the fork elements, a plurality of brackets carried by said rake element and in alignment with the lugs of the rake element, and a reversible hoe element detachably secured to said brackets.

In testimony whereof I affix my signature.

ALFRED C. PIHL.